United States Patent
Monti

(10) Patent No.: US 6,948,608 B2
(45) Date of Patent: Sep. 27, 2005

(54) METHOD AND A DEVICE FOR TRANSFERRING BLISTER PACKS AND THE LIKE TO THE FEEDING LINE OF A PACKAGING MACHINE

(75) Inventor: Giuseppe Monti, Pianoro (IT)

(73) Assignee: Marchesini Group SpA, Pianoro (IT)

(*) Notice: Subject to any disclaimer, the term of this patent is extended or adjusted under 35 U.S.C. 154(b) by 292 days.

(21) Appl. No.: 10/210,313

(22) Filed: Aug. 1, 2002

(65) Prior Publication Data

US 2004/0020747 A1 Feb. 5, 2004

(51) Int. Cl.⁷ .............................................. B65G 47/26
(52) U.S. Cl. ..................................... 198/426; 198/430
(58) Field of Search .......................... 198/426, 433, 198/428–430, 468.2, 468.4–468.5, 750.11–750.13; 414/791.6, 792.6, 792.9

(56) References Cited

U.S. PATENT DOCUMENTS 3,168,184 A  2/1965  Galvin
4,033,448 A * 7/1977  MacFarlane et al. ..... 198/468.2
5,472,077 A * 12/1995  Bolin ........................... 198/430
5,799,770 A  9/1998  Radewagen

FOREIGN PATENT DOCUMENTS

EP  1 164 099 A1  12/1991
EP  0 563 461 A1  10/1993

* cited by examiner

Primary Examiner—Joseph E. Valenza
(74) Attorney, Agent, or Firm—William J. Sapone; Coleman Sudol Sapone PC

(57) ABSTRACT

A method for transferring blister packs to a step-less moving feeding line of a packaging machine, according to which a gripping member of a three-axes robot device picks up at least one group of blister packs from an outlet line of a blistering machine. The robot device moves in a direction as the outlet line, so as to follow the movement thereof. The group of blister packs is transferred to the feeding line, following the movement thereof.

10 Claims, 3 Drawing Sheets

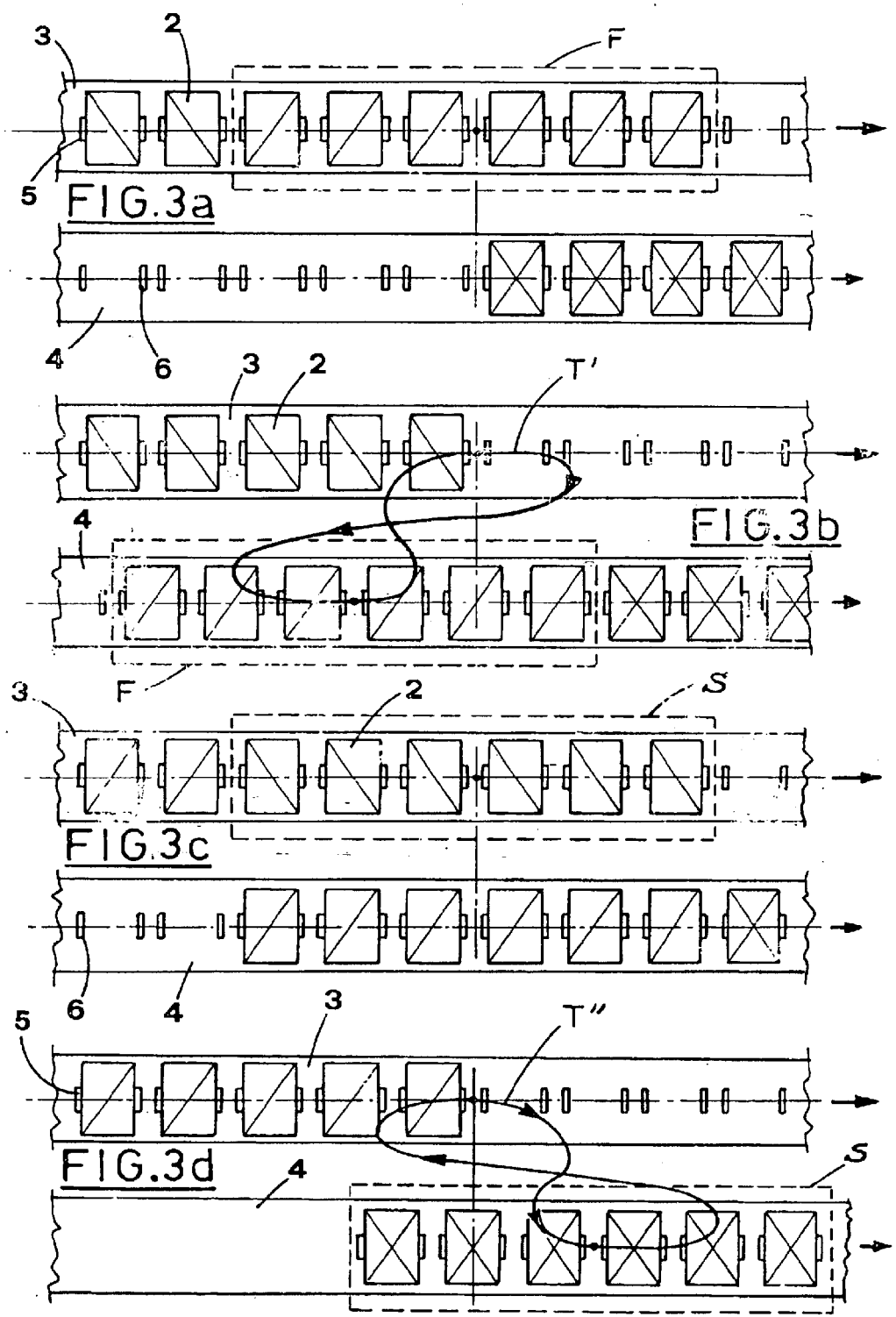

METHOD AND A DEVICE FOR TRANSFERRING BLISTER PACKS AND THE LIKE TO THE FEEDING LINE OF A PACKAGING MACHINE

BACKGROUND OF THE INVENTION

The present invention relates to production of blister packs and the like.

More particularly, the invention relates to a method for transferring blister packs from the outlet line of a blistering machine to the feeding line of a packaging machine, and a device for carrying out the method.

DESCRIPTION OF THE PRIOR ART

In this field, there is known the problem of transferring blister packs from the outlet line of the blistering machine to the packaging machine, the blister being arranged in ordered piles.

According to a known solution, the blister packs are transferred by using a a vertical magazine, inside which the blister packs coming from the outlet line of the blistering machine are stored and piled orderly one over another. Then, groups of piled blister packs are removed by suitable pushers from the bottom of the magazine and introduced into relative boxes.

According to another known solution, the blister packs are transferred by an escapement device associated to a magazine oscillating around an axis perpendicular to the translation direction of a conveyor situated below.

The conveyor is equipped with a plurality of box-like seats which receive the blister packs removed from the bottom of the magazine.

The escapement device allows to place intermittently a predetermined number of blister packs into each box-like seat of the conveyor.

The known methods for transferring blister packs feature different drawbacks and generally they are not satisfactory, in particular with regard to the connection between the blister machine and the packaging machine.

As a matter of fact, the limits of the known systems result from inconsistency between the continuous flow of the packs leaving the blistering machine and the discontinuous feeding of the packaging machine.

Consequently, the working speed of known systems is considerably lower than the potential speed that the packaging machines used at present would allow.

On the other hand, to avoid the above problems, the above mentioned solutions are very complicated from the constructive as well as from the functional point of view, and consequently they are not very convenient in practice.

SUMMARY OF THE INVENTION

The object of the present invention is to propose a method which allows an automatic continuous transferring of blister packs from the outlet line of a blistering machine to the feeding line of a packaging machine.

Another object of the present invention is to propose a method which allows to transfer ordered piles of blister packs to the feeding line of the above packaging machine.

A further object of the present invention is to propose a device carrying out the proposed method, whose structure is reliable, functional and versatile, so as to obtain ordered piles of blister packs with one or more blister packs for each pile, on the feeding line.

The above mentioned objects are obtained, in accordance with the contents of the claims, by a method for transferring blister packs from a continuously moving outlet line of a blistering machine, for conveying blister packs in a row in a forward direction, to a packaging machine feeding line moving continuously in a feeding direction, said feeding line being situated beside said outlet line, the method including:

picking up at least one group of blister packs from said outlet line by a gripping member of a robot means moving in said forward direction as said outlet line, so as to follow said outlet line;

transferring said first group of blister packs to said feeding line, following the feeding direction of said feeding line;

moving back said gripping member to a position above said outlet line, so as to pick up a next group of blister packs to be transferred to said feeding line.

The above mentioned method is carried out by a device for transferring products, such as blister packs, from a continuously moving outlet line of a blistering machine for conveying blister packs in a row, to a continuously moving feeding line of a packaging machine, said feeding line being situated beside said outlet line, including a three-axes robot means, mounted slidably on a guide situated beside and along said outlet line and feeding line, said robot means being equipped with a gripping member, movable along three axes and equipped with a plurality of suction cup means acting on the blister packs to be transferred, said gripping member being moved in a forward movement direction of said outlet line and feeding line, so as to follow the movement of said outlet line and feeding line during picking up of said groups of blister packs from said outlet line and during releasing said picked up groups of blister packs onto said feeding line.

BRIEF DESCRIPTION OF THE DRAWINGS

The characteristic features of the present invention will be pointed out in the following description of a preferred, but not only embodiment, with reference to the enclosed drawings, in which:

FIGS. 3a, 3b, 3c and 3d are plan views of the above feeding line of the packaging machine during subsequent steps of the transferring of blister packs from the outlet line of a blistering machine, according to the proposed method.

DESCRIPTION OF THE PREFERRED EMBODIMENTS

Figure 1:
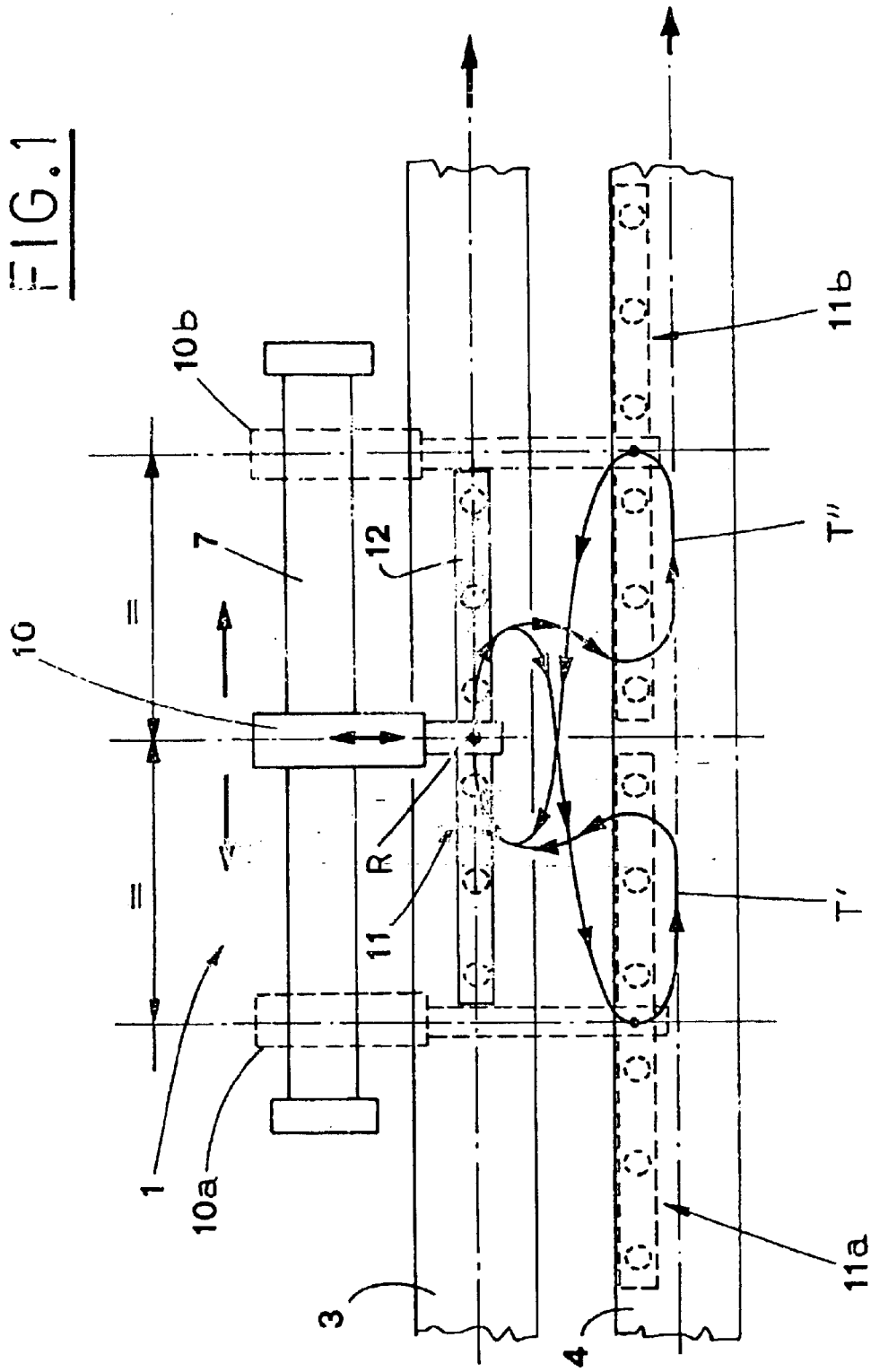
FIG. 1 is schematic plan view of a device for transferring blister packs from the outlet line of a blistering machine to the feeding line of a packaging machine.

With reference to the above Figures, reference numeral 1 indicates the device for transferring blister packs 2 from the outlet line 3 of a blistering machine to the feeding line 4 of a packaging machine.

The outlet line 3 of the blistering machine and the feeding line 4 of the packaging machine are arranged one beside the other, along a longitudinal direction.

The outlet line 3 of the blistering machine includes substantially a step-less powered belt conveyor, which carries blister packs 2 in a line, e.g. inside regularly spaced apart box-like seats 5.

The feeding line 4 of the packaging machine includes a step-less powered conveying belt, equipped with box-like seats 6 for receiving the above mentioned blister packs 2.

The device 1 includes a three-axes robot means 10, mounted slidably on a guide 7, situated longitudinally beside the outlet line 3 and the feeding line 4.

The robot means 10 is operated by motor means, not shown.

The robot means 10 is equipped with a gripping member 11, movable along the above mentioned three axes and including a bar 12, which is arranged longitudinal to the guide 7 and is equipped with a plurality of suction cups means 13, capable of acting on the blister packs 2 to be transferred.

The gripping member 11 is fastened to a double four-bar linkage 14, which drives the gripping member 11 in vertical and horizontal motion with respect to the outlet line 3 and to the feeding line 4, maintaining the suction means 13 vertical.

Figure 2A:
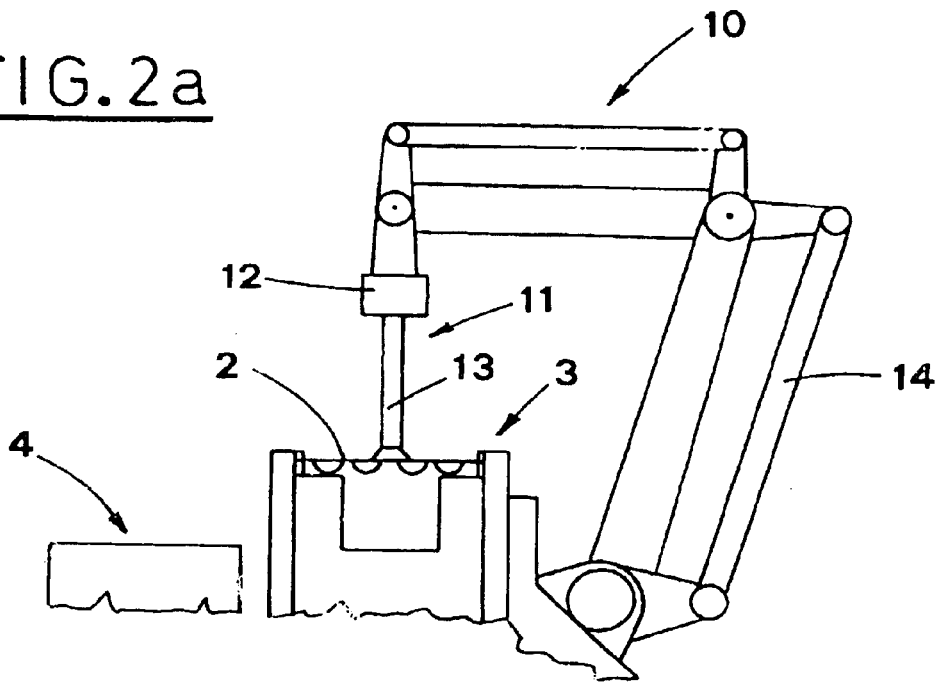
FIGS. 2a and 2b are detailed sectional views of the above transferring device, in different operation steps.
Figure 2B:
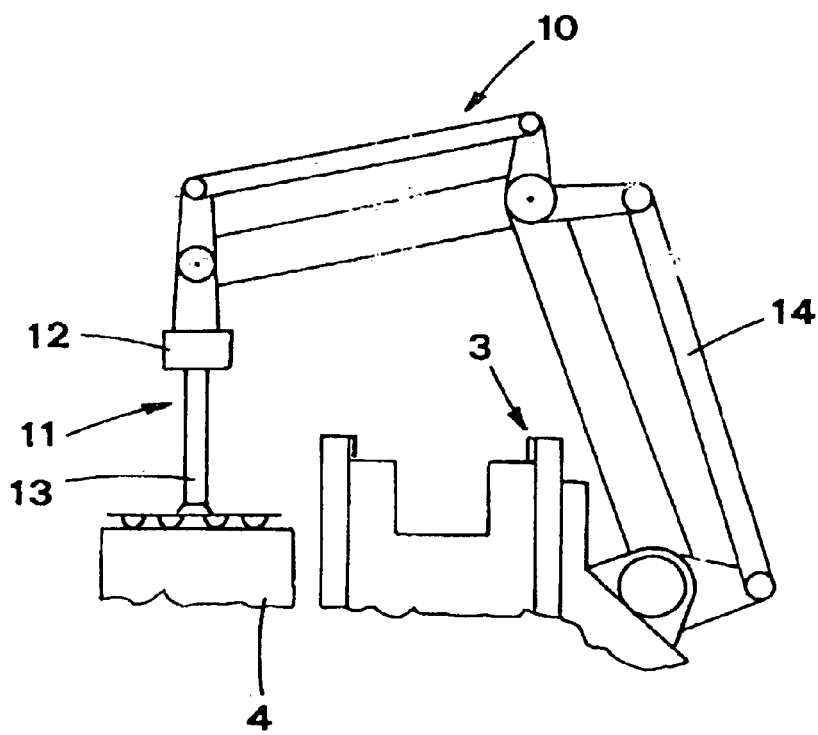

Therefore, the gripping member 11 picks up blister packs 2 from the outlet line (FIG. 2a) and transfers them to the feeding line 4 (FIG. 2b).

According to the method for transferring blister packs 2 to the feeding line 4 of the packaging machine, so as to define on the latter ordered piles of blister packs 2 with one or more blisters for each pile, a first group of blister packs 2 is picked up from the outlet line 3 by the gripping member 11 of the robot 10, which moves in the direction of the outlet line 3 forward movement, so as to follow the movement of the outlet line 3.

For this purpose, the gripping member 11 is brought first to a reference position, indicated with an enlarged point R in FIG. 1, at the median line of the outlet line 3, where the blister packs 2 are picked up.

The reference point R is situated in an intermediate position between a rear position 10a and a fore position 10b, which is the end-of-stroke stop of the robot means 10 along the guide 7.

During the picking up step, the gripping member 11 moves in synchrony with the outlet line 3 forward movement, so that its relative speed with respect to the outlet line 3 in correspondence to the point R is substantially zero.

Obviously, the gripping member 11 is imparted combined translation and raising movements, so as to lift the blister packs 2 from the outlet line 3.

The first group of blister packs 2, for sake of clarity encircled by the broken line F in FIG. 3a, is delivered to the feeding line 4 when the gripping member 11 is in, in a rearmost position 11a corresponding to the end-of-stroke position 10a of the robot means 10 (FIG. 1).

For this purpose, the gripping member 11 moves in the direction opposite to the direction of the outlet line 3 and feeding line 4 and crosswise thereto, towards the feeding line 4, at the same time.

When the gripping member 11 has reached the rearmost position 11a, it reverses the movement direction, so as to follow the movement of the feeding line 4, on which the first group F of blister packs 2 is being placed (FIG. 3b).

It is to be noted that the when the gripping member 11 reaches the rearmost position 11a, it does not take a position centered with respect to the longitudinal median line of the feeding line 4, as seen in FIG. 1.

The gripping member 11 moves to a centered position later, when the blister packs 2 are being released; during this step, the gripping member 11 moves synchronously with the feeding line 4 forward movement, so that its relative speed with respect to the feeding line 4 is substantially zero.

Moreover, the gripping member 11 is imparted combined translation and lowering movements, so as to release the blister packs 2 onto the feeding line 4.

When the first group F of blister packs 2 has been released, the gripping member 11 performs a return stroke above the outlet line 3, so as to pick up a second group S of blister packs 2, which has been brought thereto in the meantime (FIG. 3c).

As it can be seen in the figures, the gripping member 11 performs a first transferring cycle as indicated by the trajectory T'.

The gripping member 11 picks up the second group S of blister packs 2 likewise the first group F of blister packs, i.e. following the movement of the outlet line 3.

However, the gripping member 11 brings the second group S of blister packs 2 to a foremost position 11b on the feeding line 4, so that the second group S of the blister packs 2 is put over the first group, moved forward in the meantime along the feeding line 4 (FIG. 3d).

It is to be pointed out that in this case, the gripping member 11 releases the second group S of blister packs 2 on the feeding line 4, and more precisely, on the first group F of blister packs 2, before having reached a foremost position 11b corresponding to the end-of-stroke stop 10b of the robot means 10.

After having reached the foremost position 11b, the gripping member 11 reverses again the movement direction, so as to perform the return stroke back to the outlet line 3.

Practically, the gripping member 11 completes a second transferring cycle indicated with the trajectory T".

The transferring cycles T' and T" are properly controlled by programmable means, which control the movements and related speeds imposed to the gripping member 11 by the robot means 10.

It is to be noted that the speeds of the outlet line 3 and the feeding line 4 are suitable differentiated, in relation to the need to pick up single groups of blister packs from the outlet line 3 and to form piles of the blister packs on the feeding line 4.

In order to form piles of two blister packs, as described previously, the speed of the outlet line 3 is double with respect to the speed of the feeding line 4.

Thus, the described method achieves the object of transferring automatically and continuously blister packs from the outlet line of a blistering machine to the feeding line of a packaging machine: the feeding line of a packaging machine carries single blister packs or ordered piles of two or more blister packs.

Actually, the proposed method allows to pick up, in a simple way, the blister packs 2 from the outlet line 3 of the blistering machine, which moves on a step-less basis, and to transfer the picked up, orderly piled, blister packs to the feeding line 4 of the packaging machine, which also moves in step-less way.

The proposed solution allows to obtain a high operation speed and consequently, to use in best way the machines productive capability.

Obviously, it is possible to transfer single blister packs or piles formed by a different number of blister packs, changing correspondingly the transferring strokes of the gripping member 11.

For instance, in order to obtain piles formed by three blister packs, an intermediate cycle is needed between the two described previously, so as to release another group of blister packs in a position intermediate between the rearmost position 11a and the foremost position 11b.

It is to be pointed out that the proposed method is carried out by a very simple, functional as well as versatile, device.

What is claimed is:

1. A method for transferring blister packs from a continuously moving outlet line of a blistering machine, for conveying blister packs in a row in a forward direction, to a packaging machine feeding line moving continuously in a feeding direction, said feeding line being situated beside said outlet line, the method including:

picking up at least one group of blister packs from said outlet line by a gripping member of a robot means moving in said forward direction as said outlet line, so as to follow said outlet line;

transferring said first group of blister packs to said feeding line, following the feeding direction of said feeding line;

moving back said gripping member to a position above said outlet line, so as to pick up a next group of blister packs to be transferred to said feeding line.

2. A method, according to claim 1, further including:

picking up at least one group of blister packs from said outlet line by a gripping member of a robot means moving in the forward direction as said outlet line, so as to follow said outlet line;

transferring said first group of blister packs to a rearmost position on said feeding line, following the feeding direction of said feeding line;

operating said gripping member to move back to a position above said outlet line;

picking up a second group of blister packs from said outlet line, following the forward direction of said outlet line;

transferring said second group of blister packs to a foremost position of said feeding line, so that the second group of blister packs is situated over said first group of blister packs.

3. A method, according to claim 1, wherein during blister packs picking up, said gripping member moves synchronously with said outlet line, so as to run at a zero relative speed with respect to said outlet line at a point where said groups of blister packs are picked up.

4. A method, according to claim 1, wherein during blister packs picking up, said gripping member is subjected to combined movement of raising, so as to detach said blister packs from said outlet line.

5. A method, according to claim 2, wherein during transferring of said first group of blister packs to said rearmost position along said feeding line, said gripping member performs a stroke in a direction opposite to said feeding direction of said feeding line and, simultaneously, said gripping member translates crosswise towards the feeding line.

6. A method, according to claim 5, wherein after having reached said rearmost position, said gripping member reverses its movement, so as to follow the feeding direction of said feeding line and so that the relative speed thereof with respect to said feeding line in correspondence to the point, where said first group of blister packs has been released.

7. A method, according to claim 2, wherein said gripping member places said second group of blister packs over said first group of blister packs, which is carried by said feeding line, before reaching said foremost position where said gripping member reverses its movement to perform a return stroke to said outlet line.

8. A method, according to claim 2, wherein said feeding line is mover at a suitably reduced speed with respect to said outlet line, in relation to the number of said blister packs, which are to form the pile.

9. A device for transferring products, such as blister packs, from a continuously moving outlet line of a blistering machine for conveying blister packs in a row, to a continuously moving feeding line of a packaging machine, said feeding line being situated beside said outlet line, including a three-axes robot means, mounted slidably on a guide situated beside and along said outlet line and feeding line, said robot means being equipped with a gripping member, movable along three axes and equipped with a plurality of suction cup means acting on the blister packs to be transferred, said gripping member being moved in a forward movement direction of said outlet line and feeding line, so as to follow the movement of said outlet line and feeding line during picking up of said groups of blister packs from said outlet line and during releasing said picked up groups of blister packs onto said feeding line.

10. A device, according to claim 9, wherein while picking up said groups of blister packs, said gripping member is moved with a speed as the outlet line, and while releasing said picked up groups, the gripping member is moved with a speed as the feeding line.

* * * * *